US007168365B2

(12) United States Patent
Trevisan

(10) Patent No.: US 7,168,365 B2
(45) Date of Patent: Jan. 30, 2007

(54) TRANSFER OF IMAGE WITH SUBLIMATING INKS AND MEDIUM IN SHEET FORM FOR PERFORMING IT

(75) Inventor: Tito Trevisan, Verona (IT)

(73) Assignee: Paradigma S.R.L., Verona (IT)

( * ) Notice: Subject to any disclaimer, the term of this patent is extended or adjusted under 35 U.S.C. 154(b) by 0 days.

(21) Appl. No.: 10/490,698

(22) PCT Filed: Oct. 1, 2001

(86) PCT No.: PCT/EP01/11340

§ 371 (c)(1),
(2), (4) Date: Mar. 25, 2004

(87) PCT Pub. No.: WO03/029018

PCT Pub. Date: Apr. 10, 2003

(65) Prior Publication Data

US 2004/0206256 A1 Oct. 21, 2004

(51) Int. Cl.
*G01D 11/00* (2006.01)

(52) U.S. Cl. .......................... 101/33; 101/35; 101/488; 101/492; 428/195.1; 428/206; 428/913; 347/100

(58) Field of Classification Search ............ 428/195.1, 428/206, 913, 914, 346; 101/33, 35, 492, 101/488; 347/100
See application file for complete search history.

(56) References Cited

U.S. PATENT DOCUMENTS 3,530,794 A 9/1970 Gerhard
2005/0093947 A1* 5/2005 Maekawa et al. ........... 347/100
2005/0101483 A1* 5/2005 Washizuka .................. 503/201
2005/0248649 A1* 11/2005 Farrell et al. ............... 347/216
2006/0021163 A1* 2/2006 Chervin ......................... 8/471

FOREIGN PATENT DOCUMENTS

EP 0 710 508 5/1996

* cited by examiner

*Primary Examiner*—Daniel J. Colilla
*Assistant Examiner*—Kevin D. Williams
(74) *Attorney, Agent, or Firm*—Modiano & Associati; Albert Josif; Daniel O'Byrne

(57) ABSTRACT

A method for manufacturing a medium in sheet form that can be used for the sublimation transfer of an ink onto an imprintable medium; the medium in sheet form comprises at least one supporting layer, at least one adhesive coating and a plurality of granular or elongated elements designed to be applied to the adhesive coating; the method comprising the steps of preparing the granular or elongated elements so as to render them sensitive to the action of an electromagnetic field and applying the granular or elongated elements to the adhesive coating with the interposition of the electromagnetic field having lines of force f that are substantially perpendicular to the supporting layer, so as to arrange a monolayer of granular or elongated elements according to a predefined distribution.

14 Claims, 2 Drawing Sheets

TRANSFER OF IMAGE WITH SUBLIMATING INKS AND MEDIUM IN SHEET FORM FOR PERFORMING IT

The present invention relates to a method for the transfer of an image with inks, particularly sublimating inks, and to the medium in sheet form for performing it.

BACKGROUND OF THE INVENTION

Among the indirect printing processes currently in use, the ones that use inks, for example of the sublimating type, consist in transferring an image previously deposited on a plate-like medium, commonly known as transfer medium, onto the surface of an object to be decorated, which is known as imprintable item.

One of the fundamental requirements for achieving a satisfactory resolution of the printed image is that during the transfer the transfer medium must: be perfectly in contact with the imprintable medium, so that the inks, by sublimating, penetrate the imprintable surface uniformly and homogeneously.

From the above description it is evident that in order to perform the sublimation transfer of an image onto a contoured surface it is necessary to adopt a transfer medium that is capable of adhering exactly to the surface of the imprintable item, and in this case media made of paper-like material or the like are inadequate, producing considerable printing defects caused by the inevitable creases.

This has led to interest in using, for the transfer of images onto irregular surfaces, transfer mediums made of elastic materials, such as for example elasticized cotton fabrics, which however have considerable drawbacks due both to the particularly high costs of the fabrics used and to the fact that their woven structure often compromises printing quality, considerably reducing the degree of fidelity of the reproduced image.

If a medium made of elastoplastic material is used, one observes during the transfer of the ink in the vaporization phase an enormous difficulty in draining the gas, with consequent forming of bubbles and reduction of the quality of the final surface.

SUMMARY OF THE INVENTION

The aim of the present invention is to provide a method for manufacturing a medium in sheet form that acts as a transfer medium in the process for transferring an image, particularly with sublimating inks, that is capable of eliminating or substantially reducing the above noted drawbacks related to current technical solutions for indirect printing by sublimation transfer.

Within this aim, an object of the present invention is to provide a process that allows to produce a medium in sheet form, paying attention to the structural and dimensional properties of the granular or elongated elements that compose its active surface so as to reproduce with a chosen degree of fidelity on the imprintable surface an image printed earlier on the medium in sheet form.

Another object of the present invention is to provide a method that allows to utilize the distribution and density of the granular or elongated elements that compose the active surface of a medium in sheet form to transfer an image with a degree of fidelity that corresponds to the dpi (dots per inch) value set on the printing device dedicated to depositing the image on the medium in sheet form.

Another object of the present invention is to provide a medium in sheet form whose structure allows to render the transfer process, particularly the sublimation transfer process, repeatable in qualitative terms, ensuring high resolution fidelity and printing uniformity over the entire imprintable surface.

Another object of the present invention is to allow, by using such medium in sheet form, to disperse the gases generated if transfer is performed with sublimating inks, so as to maintain a uniform pressure inside the interspace delimited by the medium in sheet form and by the imprintable surface and thus ensure uniform penetration of the inks into said imprintable surface.

Another object of the present invention is to provide a medium in sheet form that allows the transfer of an image with sublimating inks even on irregular surfaces without requiring particular accessories, such as molds, complementary molds, pads or others.

Another object of the present invention is to provide a medium in sheet form that has low production costs and is simple and quick to apply.

Another object of the present invention is to provide a method for inking the medium in sheet form that provides for inking the active surface of said medium in sheet form in a controlled manner, so as to achieve a faithful reproduction of the image in terms of dpi and so as to delimit, between the imprintable layer and the inked medium in sheet form, a sort of channel system suitable to allow dispersion of the gases generated during use by the sublimation of said ink.

Another object of the present invention is to provide an inking method that can be performed with any of the conventional printing techniques, such as for example rotogravure, screen printing, lithography, direct digital plotter printing, film retransfer printing, and others.

According to a first aspect of the present invention, a method is provided for manufacturing a medium in sheet form that can be used in particular for the sublimation transfer of ink onto an imprintable medium, said medium in sheet form comprising at least one supporting layer, at least one adhesive coating for said supporting layer and a plurality of granular or elongated elements meant to be applied to said adhesive coating, said method being characterized in that it comprises the steps of:

- preparing said granular or elongated elements so as to render them sensitive to the action of an electromagnetic field; and
- applying said granular or elongated elements to said adhesive coating with the interposition of said electromagnetic field having lines of force that are substantially perpendicular to said supporting layer, so as to arrange a monolayer of said granular or elongated elements according to a predefined distribution.

A second aspect of the present invention relates to a medium in sheet form that comprises at least one supporting layer, at least one adhesive coating for said supporting layer, and a plurality of granular or elongated elements meant to be applied to said adhesive coating and characterized in that said granular or elongated elements have controlled dimensions and are implanted in said adhesive coating according to a predefined distribution.

According to a third aspect of the present invention, a method for inking a medium in sheet form is provided which is characterized in that it comprises the step of spreading on said medium in sheet form of an ink having viscosity, wettability and hydrophilicity properties that allow it to penetrate said medium in sheet form to a predefined depth and allow a gradual reduction of the solvent portion and a corresponding increase in the concentration of pigment in the molecules that compose said ink.

Advantageously, such method entails delimiting a gaseous interspace between said imprintable layer and said medium in sheet form inked with said ink, said interspace acting as a channel system for the outward drainage of the air and of the gas phases generated during the sublimation of said ink, so as to maintain a uniform pressure inside it.

A final aspect of the present invention relates to a method for sublimation transfer, characterized in that it comprises the steps of spreading said medium in sheet form onto said imprintable layer and applying to said medium in sheet form a uniform pressure that makes it adhere perfectly to said imprintable layer.

Advantageously, such method provides for the generation of a pressure difference on the opposite side with respect to said supporting layer, so as to obtain a hydrostatic compression pressure that is suitable to press from the outside said medium in sheet form against said imprintable layer.

BRIEF DESCRIPTION OF THE DRAWINGS

Further characteristics and advantages of the present invention will become better apparent from the following detailed description of some currently preferred examples of embodiment thereof, given merely by way of non-limitative example with reference to the accompanying drawings, wherein.

DESCRIPTION OF THE PREFERRED EMBODIMENTS

Figure 1:
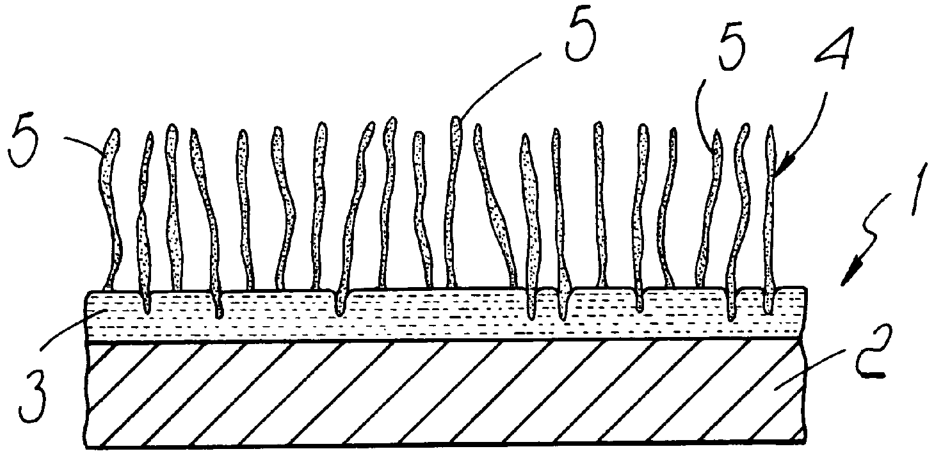
FIG. 1 is a sectional view of a medium in sheet form according to the present invention.

In the accompanying drawings, identical or similar parts or components have been designated by the same reference numerals.

Figure 2:
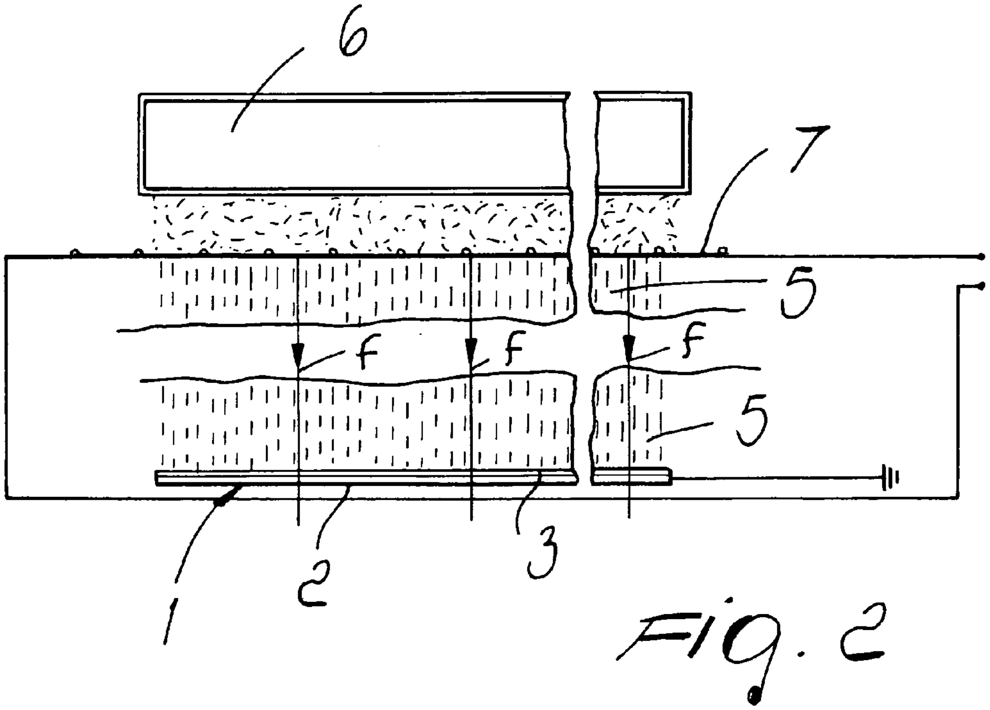
FIG. 2 is a schematic view of the method for manufacturing the medium in sheet form of FIG. 1.

Initially with reference to FIGS. 1 and 2, a medium in sheet form for printing by sublimation transfer according to the present invention, designated by the reference numeral 1, is composed of a supporting layer 2, preferably made of thermoplastic material, such as for example PVA (polyvinyl alcohol), polyethylene, polyesters, polyurethanes, PVC and the like, of an adhesive coating 3 meant to cover at least the active face of the supporting layer 2, and of an active layer 4, at which the image to be transferred onto the item to be decorated is deposited during use.

In particular, the adhesive coating is advantageously constituted by an adhesive whose particularity is that it is substantially impermeable to gases and particularly to the gaseous phase of sublimating inks during high-temperature transfer.

This characteristic in fact allows the molecules of the ink to adhere to the active surface 4 during high-temperature transfer, avoiding in particular the forming of bubbles.

More particularly, adhesives that have this characteristic are, for example, VAC (vinyl acetate), PVA (polyvinyl acetate), EVA (ethylene vinyl acetate), PUR (polyurethane), and similar adhesives.

Moreover, one might also use a same material for the supporting layer, for example PVA, which also acts as adhesive coating.

Advantageously, the active layer 4 is composed of a plurality of micronized elongated elements 5, which are made of materials having properties in terms of resistance to thermal and mechanical stresses that are substantially constant over the temperature interval between 0 and 220° C. in order to avoid their collapse during the printing process.

The method for manufacturing the medium in sheet form 1 shown in FIG. 1 further requires the elongated elements 5 to have an overall diameter D within the range of 3 to 1000 microns and a length L that is variable between 3 and 3000 microns, so as to obtain a preset L/D ratio, providing elongated elements 5 having a substantially straight axis and capable of maintaining their structure unchanged during the printing cycle or cycles.

Conveniently, the elongated elements are constituted by materials that are inert with respect to infiltration (absorption) of sublimating inks at the transition temperature (0–220° C.); for example, one material that has these characteristics is Rayon.

Advantageously, in order to provide the active layer 4 of the medium in sheet form 1 as shown in FIG. 1, the properties of an electromagnetic field are used, this expression being used to include a field of electrostatic, magnetic or electromagnetic forces.

Assuming, for example, that an electric field E is used, the material that composes the elongated elements 5 is advantageously chosen among those that have marked dielectric properties, so that the elongated elements 5 can be polarized and are therefore sensitive to the action of the electric field E.

Hydrophilicity is another important property to be considered in choosing the materials to be adopted for the elongated elements 5, since the degree of wettability of the active layer 4 of the medium in sheet form 1 depends on it.

The method for manufacturing the medium in sheet form 1 according to the present invention therefore provides for the application of the above described elongated elements 5 to the supporting layer 2 covered by the adhesive coating 3, so that they are implanted at one end and with their axes on average at right angles to the supporting layer 2.

Such an arrangement of the elongated elements 5 (see FIG. 1) is thus made possible by way of the action of the electric field E interposed between a dispenser 6 of elongated elements 5 and the supporting layer 2 and has lines of force f directed at right angles to said supporting layer.

When the elongated elements 5, released by the dispenser 6, cross the electric field E, they are automatically orientated along the lines of force f so that their axis is on average at right angles to the underlying supporting layer 2, thus being inserted with one end in the adhesive coating 3, which is wet for this purpose.

The result is shown in FIG. 1, which shows how the active layer 4 has a structure that is substantially "brush-like" and has a plurality of elongated elements 5 that are distributed uniformly and according to a density that can vary according to the intensity of the electric field E. When the electric field E is weak, i.e., has a low intensity, the lines of force f are in fact rather spaced apart and therefore the number of elongated elements 5 applied per unit surface is small. Vice versa, with a high-intensity electric field E, the lines of force are denser and therefore the density of the elongated elements 5 that compose the active layer 4 of the medium in sheet form 1 also increases.

The density of the elongated elements 5 implanted in the supporting layer 2 can be controlled not only by adjusting the intensity of the electric field E but also by applying a sequence of vibrations for compaction, by way of which it is possible to arrange the elongated elements 5 in a more orderly and compact fashion.

The electric field E can be generated by an electrostatic grid 7 interposed between the dispenser 6 and the adhesive coating 3 and charged electrically so as to generate lines of force f that are perpendicular thereto. Since the supporting layer 2 is preferably made of conducting material, the lines of force f affect the supporting layer 2 without being deflected and therefore are perpendicular thereto.

A medium in sheet form 1 as described above is therefore capable of transferring an image with high fidelity onto an object of any shape, by having a structure that is such as to keep substantially unchanged the degree of definition of the image, both in terms of color intensity and in terms of graphic resolution (dpi), through the two passages required by indirect printing by sublimation transfer.

Figure 3:
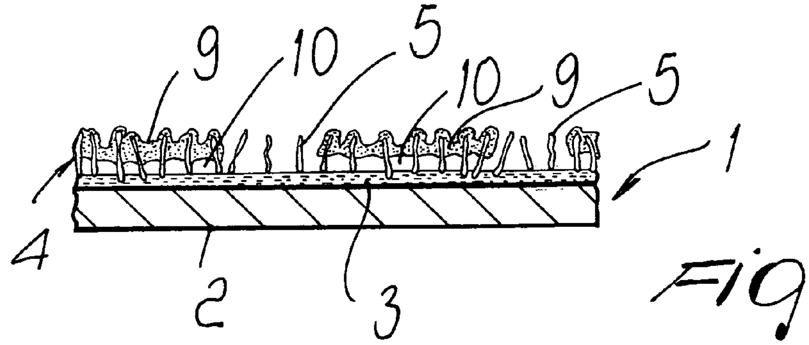
FIG. 3 is a sectional view of a medium in sheet form inked with a high-wettability ink.
Figure 4:
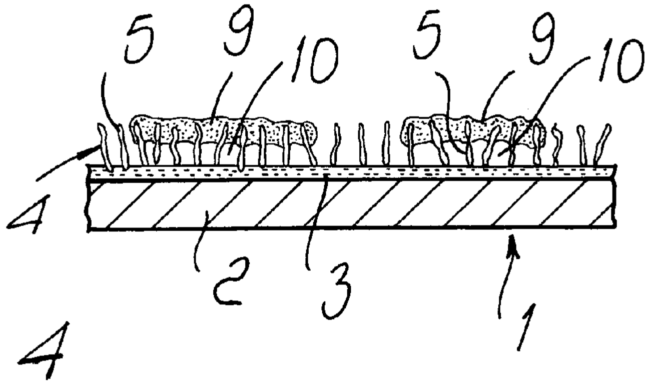
FIG. 4 is a sectional view of a medium in sheet form inked with a high-viscosity ink.

As can be deduced from FIGS. 3 and 4, the quality of the images transferred on an imprintable medium 8 depends to a significant extent also on the type of ink used and on the method used to ink the active layer 4.

The inking method can be performed by way of any of the normal printing techniques, such as for example screen printing, direct digital plotter printing, rotogravure, film retransfer printing, and others.

The choice of the ink 9 to be used in a sublimating image transfer process in fact requires consideration of a series of parameters, such as viscosity, wettability, hydrophilicity, hydrophobicity and surface tension, on the basis of which it is possible to alter the behavior of an ink 9 during the inking of a transfer medium 1.

As shown in FIGS. 3 and 4, depending on whether the ink 9 has a high wettability index or a high viscosity, it tends respectively to penetrate more deeply in the active layer 4 or to occupy a surface portion, limiting itself to wetting only the free ends of the elongated elements 5.

In the inking process according to the present invention, however, the ink 9 penetrates the active layer 4 of the medium in sheet form 1 to a preset depth and distributes itself at the elongated elements 5 according to a preset arrangement, so as to delimit, in the spaces between the various elongated elements 5 inked with ink 9, a plurality of minute channels 10 that are connected to each other and to the outside.

A medium in sheet form 1 that has undergone an inking process as described above is thus ready for the sublimation transfer operation.

Figure 5:
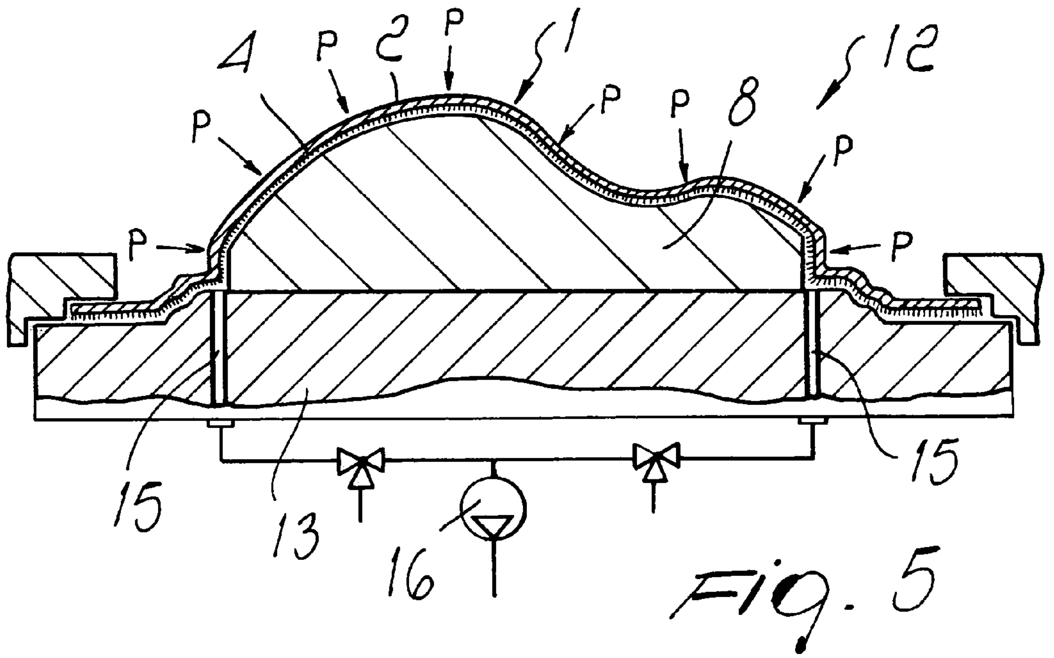
FIG. 5 is a schematic sectional view of a device for performing the method for transferring an image by means of sublimating inks.

FIG. 5 illustrates a device 12 dedicated to the execution of the sublimation transfer of an image by means of a medium in sheet form 1 on a generic imprintable medium 8.

The device 12 can be composed of a base platform 13, which has a flat portion 14 at which the imprintable medium 8 is placed during use. The base platform 13 is advantageously provided with a plurality of channels 15 meant to connect the upper active area with a respective pump 16 that is suitable to aspirate, during use, the air and the gas phases generated during sublimation of the ink 9.

The transfer method according to the present invention therefore entails depositing the medium in sheet form 1, previously inked with ink 9, on the imprintable layer 8 and operating the pump 16 to aspirate the air contained in the interspace 17 delimited by the medium in sheet form 1 and by the imprintable layer 8. This produces a difference in pressure between the interspace 17 and the space 18 above the medium in sheet form 1 and therefore produces a hydrostatic pressure P that is suitable to compress the medium in sheet form 1 against the imprintable layer 8.

The pressure inside the interspace 17 can therefore be constantly monitored and adjusted by the pump 16, by way of which it is possible to lower the pressure inside the interspace 17 to a minimum value of −75 cmHg.

Once the medium in sheet form 1 has been made to adhere perfectly to the imprintable layer 8, it is possible to start the process for sublimating the ink 9 by raising the temperature to the sublimation threshold, which can be between 120 and 220° C.

In order to maintain a uniform pressure inside the interspace 17, the pump 16 aspirates, during use, the gas phases that inevitably form during sublimation of the ink 9, so that the sum of the partial pressures of the individual gaseous components contained in the interspace 17 is approximately constant.

By means of the particular structure of the medium in sheet form 1 described above, during the process for the sublimation of the ink 9 the constant evacuation of the gas phases present between the individual elongated elements 5 is allowed and therefore uniform penetration of the ink 9 in the imprintable layer 8 is allowed. Through the minute interconnected channels 10 delimited between the elongated elements 5 it is in fact possible, by way of the pump 16, to aspirate the air contained therein up to a negative pressure of −75 cmHg and to drain outward or toward the space 18 all the gas phases generated during the sublimation transfer process.

The method for manufacturing and inking a medium in sheet form 1 and the medium in sheet form 1 itself as described above are susceptible of numerous modifications and variations within the protective scope defined by the content of the claims.

Thus, for example, the active layer 4 of the medium in sheet form 1 can be composed of a plurality of granular elements (not shown in the figures), preferably of the same material as the above described elongated elements 5. The granular elements, after being polarized, are deposited onto the supporting layer 2 by utilizing their sensitivity to the action of an electric field E, so as to arrange themselves on a monolayer and according to a predefined distribution.

In this case also, the uniform and ordered arrangement of the granular elements on the active layer 4, in addition to ensuring high fidelity of image reproduction, forms between the granular elements already inked with ink 9, during use, a plurality of mutually connected minute channels that are useful for drainage of the air and gas phases produced by sublimation of the ink 9, so as to achieve a further improvement in printing quality.

Advantageously, the granular elements can be constituted by a plurality of spheroidal bodies that have a substantially uniform diameter.

Furthermore, the process for the controlled application of the elongated elements 5 and of the granular elements can be performed by using a magnetic field instead of an electric one. In this case, the elongated elements 5 and the granular elements must have para- or ferromagnetic properties so that they are magnetized when they are immersed in the external magnetic field and so that they orientate their dipoles in the direction of the magnetic field.

Furthermore, the resulting material and film can be heat-sealed, allowing to obtain for example closed pouches or bags.

Finally, the medium in sheet form obtained according to the described method can also be used for physical transfer, i.e., not only transfer by sublimation, of the ink onto an imprintable layer.

In practice, the materials and the dimensions may be various according to requirements.

What is claimed is:

1. A medium in sheet form for sublimation transfer of ink onto an imprintable medium, comprising at least one supporting layer, at least one adhesive coating for said supporting layer and a plurality of elongated elements applied to said adhesive coating, said plurality of elongated elements holding said ink and transferring said ink to the imprintable medium during a sublimation process, wherein said elongated elements have controlled dimensions and are implanted in said adhesive coating according to a predefined distribution, and are constituted by materials that are inert with respect to infiltration or absorption of sublimating inks at the transition temperature of 0–220° C.

2. The medium in sheet form according to claim 1, wherein said elongated elements have a preset ratio between length and diameter, are implanted at one end in said adhesive coating and are arranged so that their main axis is on average perpendicular to said supporting layer.

3. The medium in sheet form according to claim 2, wherein said elongated elements have a length between approximately 3 and 3000 microns and a diameter between approximately 3 and 1000 microns.

4. The medium in sheet form according to claim 2, wherein said elongated elements have dielectric properties by way of which they can be polarized if immersed in an electric field and are composed of a material that can be wetted by solvent inks of various kinds and is resistant to thermal-mechanical stresses within a temperature range of approximately 0 to 240° C.

5. The medium in sheet form according to claim 4, wherein said dielectric properties of said elongated elements are obtained by immersing said elements in a bath composed of ionic or polarizing substances.

6. The medium in sheet form according to claim 2, wherein said elongated elements have para- or ferromagnetic properties that make them sensitive to the action of an external magnetic field.

7. The medium in sheet form according to claim 2, wherein said elongated elements have marked hydrophilic properties that arise both from the nature of the materials of which they are constituted and from their structure, which delimits an external surface whose extension is such as to attract solvents contained in the ink, separate said solvents from a pigment contained in the ink, and allow their removal, so as to make said medium in sheet form usable in processes using digital plotter printing.

8. The medium in sheet form according to claim 2, wherein said elongated elements are applied to said adhesive coating according to a uniform distribution and to a density that corresponds to the intended degree of print resolution.

9. The medium in sheet form according to claim 2, wherein said adhesive coating is an adhesive that is substantially impermeable to gases of sublimating inks in the gaseous phase.

10. The medium in sheet form according to claim 9, wherein said adhesive is made of a thermoplastic material chosen among the group constituted by PVA (polyvinyl acetate), PVB (polyvinyl butyral), VAC (vinyl acetate), EVA (ethylene vinyl acetate), PUR (polyurethane).

11. The medium according to claim 2, wherein said supporting layer is made of adhesive material.

12. The medium according to claim 2, wherein that said adhesive coating is part of said supporting layer.

13. A medium in sheet form for sublimation transfer of ink onto an imprintable medium, comprising at least one supporting layer, at least one adhesive coating for said supporting layer and a plurality of elongated elements applied to said adhesive coating, said plurality of elongated elements holding said ink and transferring said ink to the imprintable medium during a sublimation process, wherein said elongated elements have controlled dimensions and are implanted in said adhesive coating according to a predefined distribution, wherein said adhesive coating is an adhesive that is substantially impermeable to gases of sublimating inks in the gaseous phase, wherein said adhesive is made of a thermoplastic material chosen from the group consisting of PVB (polyvinyl butyral), VAC (vinyl acetate), EVA (ethylene vinyl acetate).

14. A medium in sheet form for sublimation transfer of ink onto an imprintable medium, comprising at least one supporting layer, at least one adhesive coating for said supporting layer and a plurality of elongated elements applied to said adhesive coating, said plurality of elongated elements holding said ink and transferring said ink to the imprintable medium during a sublimation process, wherein said elongated elements have controlled dimensions and are implanted in said adhesive coating according to a predefined distribution, wherein said elongated elements have a preset ratio between length and diameter, are implanted at one end in said adhesive coating and are arranged so that their main axis is on average perpendicular to said supporting layer and wherein said elongated elements have marked hydrophilic properties that arise both from the nature of the materials of which they are constituted and from their structure, which delimits an external surface whose extension is such as to attract solvents contained in the ink, separate said solvents from a pigment of the ink, and allow their removal, so as to make said medium in sheet form usable in processes using digital plotter printing.

* * * * *